: US 11,245,279 B2
(45) Date of Patent: Feb. 8, 2022

(12) United States Patent
Abe et al.

(10) Patent No.:

(54) CHARGE-DISCHARGE CONTROL CIRCUIT, CHARGE-DISCHARGE CONTROL DEVICE, AND BATTERY DEVICE

(71) Applicant: ABLIC Inc., Chiba (JP)

(72) Inventors: Satoshi Abe, Chiba (JP); Fumihiko Maetani, Chiba (JP)

(73) Assignee: ABLIC INC., Chiba (JP)

( * ) Notice: Subject to any disclaimer, the term of this patent is extended or adjusted under 35 U.S.C. 154(b) by 55 days.

(21) Appl. No.: 16/792,612

(22) Filed: Feb. 17, 2020

(65) Prior Publication Data

US 2020/0274384 A1 Aug. 27, 2020

(30) Foreign Application Priority Data

Feb. 21, 2019 (JP) .............................. JP2019-028991

(51) Int. Cl.
*H02J 7/00* (2006.01)

(52) U.S. Cl.
CPC ...... *H02J 7/007182* (2020.01); *H02J 7/0047* (2013.01); *H02J 7/007194* (2020.01)

(58) Field of Classification Search
None
See application file for complete search history.

(56) References Cited

U.S. PATENT DOCUMENTS

| 6,208,117 B1* | 3/2001 | Hibi ..................... H02J 7/0031 320/134 |
| 7,502,700 B2* | 3/2009 | Iwaizono ............. H02J 7/0029 702/63 |
| 10,074,875 B2* | 9/2018 | Shibata .................... H02J 7/04 |
| 10,711,757 B2* | 7/2020 | Kim .................. H02J 7/007194 |
| 2003/0085690 A1* | 5/2003 | Shiojima ........... H02J 7/007182 320/164 |
| 2003/0193318 A1* | 10/2003 | Ozawa .................. H02J 7/0047 320/132 |
| 2005/0127879 A1* | 6/2005 | Sato ...................... H02J 7/0031 320/134 |
| 2005/0237028 A1* | 10/2005 | Denning ............. H02J 7/00308 320/134 |
| 2008/0150488 A1* | 6/2008 | Lu ......................... H02J 7/0031 320/134 |
| 2013/0134787 A1* | 5/2013 | Sakakibara .......... H02J 7/0068 307/72 |
| 2015/0145484 A1 | 5/2015 | Shibata et al. |

FOREIGN PATENT DOCUMENTS

JP 2015-104217 A 6/2015

* cited by examiner

*Primary Examiner* — Arun C Williams
(74) *Attorney, Agent, or Firm* — Crowell & Moring LP

(57) ABSTRACT

A charge-discharge control circuit includes a positive power-supply terminal; a negative power-supply terminal; a charge-discharge discrimination circuit which discriminates a discharging state in which a discharging current flows and a charging state in which a charging current flows based on a voltage at a charge-discharge path and a preset charge-discharge discrimination voltage; and a control circuit which turns on a discharge control FET and a charge control FET in a charge-inhibition state and the discharging state or turns off the charge control FET in the charge-inhibition state and the charging state.

10 Claims, 6 Drawing Sheets

Detection temperatures are:
1. Discharge-inhibition high temperature (THD);
2. Charge-inhibition high temperature (THC);
3. Discharge-inhibition low temperature (TCD); and
4. Charge-inhibition low temperature (TCC).

Detection temperatures are:
1. Discharge-inhibition high temperature (THD);
2. Charge-inhibition high temperature (THC);
3. Discharge-inhibition low temperature (TCD); and
4. Charge-inhibition low temperature (TCC).

CHARGE-DISCHARGE CONTROL CIRCUIT, CHARGE-DISCHARGE CONTROL DEVICE, AND BATTERY DEVICE

RELATED APPLICATIONS

This application claims priority to Japanese Patent Application No. 2019-028991 filed on, Feb. 21, 2019, the entire content of which is incorporated herein by reference.

BACKGROUND OF THE INVENTION

1. Field of the Invention

The present invention relates to a charge-discharge control circuit, a charge-discharge control device, and a battery device which control charging and discharging of a battery such as a lithium battery.

2. Description of the Related Art

A battery device generally has a charge-discharge control device including a charge-discharge control circuit which detects overcharging, overdischarging, a discharging current, and a charging current. The battery device is thus constituted to protect the internal battery and supply a stable voltage to a load.

Since the charging current for charging the battery device or the discharging current for discharging the battery device flows, the battery device generates heat depending on the amount of the charging current or the discharging current.

For this reason, for example, the battery device has a temperature protection function which measures the temperatures of the battery, a charge control FET (Field Effect Transistor) for controlling charging, and a discharge control FET for controlling discharging and which inhibits charging/discharging by the exceedance of the measured temperatures over the preset threshold.

As the temperature protection function, a charge-inhibition temperature to stop charging and a discharge-inhibition temperature to stop discharging are provided. If the charge-inhibition temperature coincides with the discharge-inhibition temperature, both charging and discharging has to be stopped.

However, the charge-inhibition temperature and the discharge-inhibition temperature may be different depending on the application of the battery device.

FIG. 3 is a chart illustrating an example of setting the charge-inhibition temperature to inhibit charging and the discharge-inhibition temperature to inhibit discharging. In FIG. 3, the ordinate is the detected temperature and the abscissa is the voltage at a temperature detection terminal of the charge-discharge control circuit. In the example of FIG. 3, discharge-inhibition high temperature THD, charge-inhibition high temperature THC, discharge-inhibition low temperature TCD, and charge-inhibition low temperature TCC are set, respectively.

Here, since the discharge-inhibition high temperature THD> the charge-inhibition high temperature THC, charging is inhibited but discharging is not inhibited in a case where the temperature is above the charge-inhibition high temperature THC, and both charging and discharging are inhibited in a case where the temperature is above the discharge-inhibition high temperature THD.

On the other hand, since the discharge-inhibition low temperature TCD< the charge-inhibition low temperature TCC, charging is inhibited but discharging is not inhibited in a case where the temperature is below the charge-inhibition low temperature TCC, and both charging and discharging are inhibited in a case where the temperature is below the discharge-inhibition low temperature TCD.

FIG. 4 is a circuit diagram for describing an example of control the charging and discharging of a battery in a battery device. A battery device 550 includes a battery 400 and a charge-discharge control device 560. The charge-discharge control device 560 includes a charge-discharge control circuit 500, a discharge control FET 101, a charge control FET 102, and a temperature detection element 103.

In the discharge of the battery 400 to a load 201 under the charge-inhibition state caused by the temperature protection function, the discharging current flows through a body diode 102D of the charge control FET if the discharge control FET 101 is turned on and the charge control FET 102 is turned off.

Since the resistance of the body diode is higher than the resistance of the FET channel, the discharging current flows into the body diode 102D to increase the power consumption in the charge control FET 102. In this case, the charge control FET 102 may generate heat and hence may be damaged by an excessive temperature rise.

While the load 201 is connected and a discharging current is flowing, the charge control FET 102 needs to be turned on as well as the discharge control FET 101.

In Japanese Patent Application Laid-Open No. 2015-104217, to detect the flow of a discharging current, the voltage of the VM terminal 501 is provided from a CO terminal 502 every predetermined period to once turn off the charge control FET 102 and measure the voltage at the VM terminal 501.

Discrimination whether the discharging current is flowing or not is then carried out depending on whether the voltage at the VM terminal 501 is above the preset load detection voltage or not.

The charge-discharge control circuit 500 turns off the charge control FET 102 for a short time to detect a voltage generated across the body diode 102D so as to discriminate that the discharging current is flowing.

Here, since the discharging current flows into the body diode 102D for a short time, there is no danger that the charge control FET 102 will generate heat by the increased power consumption.

In the charge-inhibition state, discrimination whether the discharging current is flowing or not is thus carried out every predetermined period.

FIGS. 5A, 5B and 5C are timing charts for describing an operation example of charge-discharge control in the charge-inhibition state described above. In FIG. 5A, the ordinate is the temperature of the temperature detection element and the abscissa is time. In FIG. 5B, the ordinate is the voltage at the VM terminal 501 and the abscissa is time. In FIG. 5C, the ordinate is the voltage at the CO terminal 502 and the abscissa is time. In the following description, charge-discharge control in the charge-inhibition state in which the detected temperature is above the charge-inhibition high temperature is taken as an example.

Time A: The charge-discharge control circuit 500 detects that the temperature is above the charge-inhibition high temperature.

Time B: After time t1 from the detection that the temperature is above the charge-inhibition high temperature, the charge-discharge control circuit 500 outputs the voltage at the VM terminal to the CO terminal 502 regardless of the voltage at the VM terminal 501 to turn off the charge control FET 102.

Time C: At the time of connecting a charger 202 to the battery device 550, since the charge control FET 102 is in the off state, no charging current flow, and hence the voltage at the VM terminal drops to a value more negative than the voltage at a VSS terminal 504. Since the voltage at the VM terminal is lower than or equal to the load detection voltage, the charge-discharge control circuit 500 outputs, from the CO terminal 502, the voltage at the VM terminal to keep the charge control FET 102 turned off.

Time D: At the time of disconnecting the charger 202 from the battery device 550, since no charging current flows, the voltage at the VM terminal becomes equipotential to the voltage at the VSS terminal 504. Since the voltage at the VM terminal is lower than or equal to the load detection voltage, the charge-discharge control circuit 500 outputs, from the CO terminal 502, the voltage at the VM terminal to keep the charge control FET 102 turned off.

Time E: At the time of connecting the load 201 to the battery device 550, since the discharge control FET 101 is turned on, a discharging current flows. At this time, since the charge control FET 102 is in the off state, the discharging current flows through the body diode 102D of the charge control FET 102. The voltage at the VM terminal thereby exceeds the load detection voltage. Then, the charge-discharge control circuit 500 starts a counting operation during time t2.

Time F: After counting the time t2, the charge-discharge control circuit 500 outputs, from the CO terminal 502, the voltage at a VDD terminal 505 to turn on the charge control FET 102. The discharging current thereby flows through a channel of the charge control FET 102. As a result, no discharging current flows through the body diode 102D, and hence the voltage at the VM terminal drops. Further, the charge-discharge control circuit 500 starts a counting operation of time t3.

Time G: After counting the time t3, the charge-discharge control circuit 500 outputs, from the CO terminal 502, the voltage at the VM terminal to turn off the charge control FET 102.

Then, the charge-discharge control circuit 500 discriminates whether the discharging current is flowing or not depending on whether the voltage at the VM terminal is above the load detection voltage or not. Since the discharging current is flowing through the body diode 102D at this time, the voltage at the VM terminal is above the load detection voltage. The charge-discharge control circuit 500 thereby starts a counting operation for time t2.

The above-described charge-discharge control in Japanese Patent Application Laid-Open No. 2015-104217 discriminates whether the discharging current is flowing or not depending on whether the voltage at the VM terminal which is raised by a voltage generated across the body diode 102D of the charge control FET 102 exceeds the load detection voltage or not.

This prevents the discharging current in the charge-inhibition state from continuing to flow through the body diode 102D to suppress the generation of heat in the charge control FET 102 due to an increase in power consumption.

However, since charge-discharge control in Japanese Patent Application Laid-Open No. 2015-104217 is to discriminate whether a discharging current is flowing or not, the charge control FET 102 is once turned off from the on state, causing ripple-like noise in a voltage output to the load 201.

Further, if the settings of the discharge-inhibition temperature and the charge-inhibition temperature are opposite to the settings in the above-described example, it will be possible to charge in the discharge-inhibition state. While the charge control FET 102 is turned on, on/off control of the discharge control FET 101 is made to detect a change in the voltage at the VM terminal due to the flow of a charging current through the body diode 101D of the discharge control FET 101, to discriminate whether the charger 202 is connected and the charging current is flowing or not. Even in this case, the discharge control FET 101 generates heat due to the charging current in the discharge-inhibition state like in the case where the charge control FET 102 generates heat due to the discharging current in the charge-inhibition state as described above.

SUMMARY OF THE INVENTION

The present invention provides a charge-discharge control circuit, a charge-discharge control device, and a battery device, capable of performing discharge control in a charge-inhibition state and charge control in a discharge-inhibition state without repeating on/off of a charge control FET to make a discharging current flow into a body diode of the charge control FET in order to discriminate whether the discharging current is flowing or not, and without repeating on/off of a discharge control FET to make a charging current flow into a body diode of a discharge control FET in order to discriminate whether the charging current is flowing or not.

A charge-discharge control circuit according to one aspect of the present invention includes a positive power-supply terminal; a negative power-supply terminal; a charge-discharge discrimination circuit which discriminates a discharging state in which a discharging current flows or a charging state in which a charging current flows based on a voltage at a charge-discharge path and a preset charge-discharge discrimination voltage; and a control circuit which turns on a discharge control FET and a charge control FET in a charge-inhibition state and the discharging state, and which turns off the charge control FET in the charge-inhibition state and the charging state.

A charge-discharge control circuit according to another aspect of the present invention includes a positive power-supply terminal; a negative power-supply terminal; a charge-discharge discrimination circuit which discriminates a charging state in which a charging current flows or a discharging state in which a discharging current flows based on a voltage at a charge-discharge path and a preset charge-discharge discrimination voltage; and a control circuit which turns on a discharge control FET and a charge control FET in a discharge-inhibition state and the charging state, and which turns off the discharge control FET in the discharge-inhibition state and the discharging state.

According to the invention, there can be provided the charge-discharge control circuit, the charge-discharge control device, and the battery device, capable of performing discharge control in a charge-inhibition state and charge control in a discharge-inhibition state without repeating on/off of a charge control FET to make a discharging current flow into a body diode of the charge control FET in order to discriminate whether the discharging current is flowing or not, and without repeating on/off of a discharge control FET to make a charging current flow into a body diode of the discharge control FET in order to discriminate whether the charging current is flowing or not.

DETAILED DESCRIPTION OF THE PREFERRED EMBODIMENTS

First Embodiment

The first embodiment of the present invention will be described below with reference to the accompanying drawings.

Figure 1:
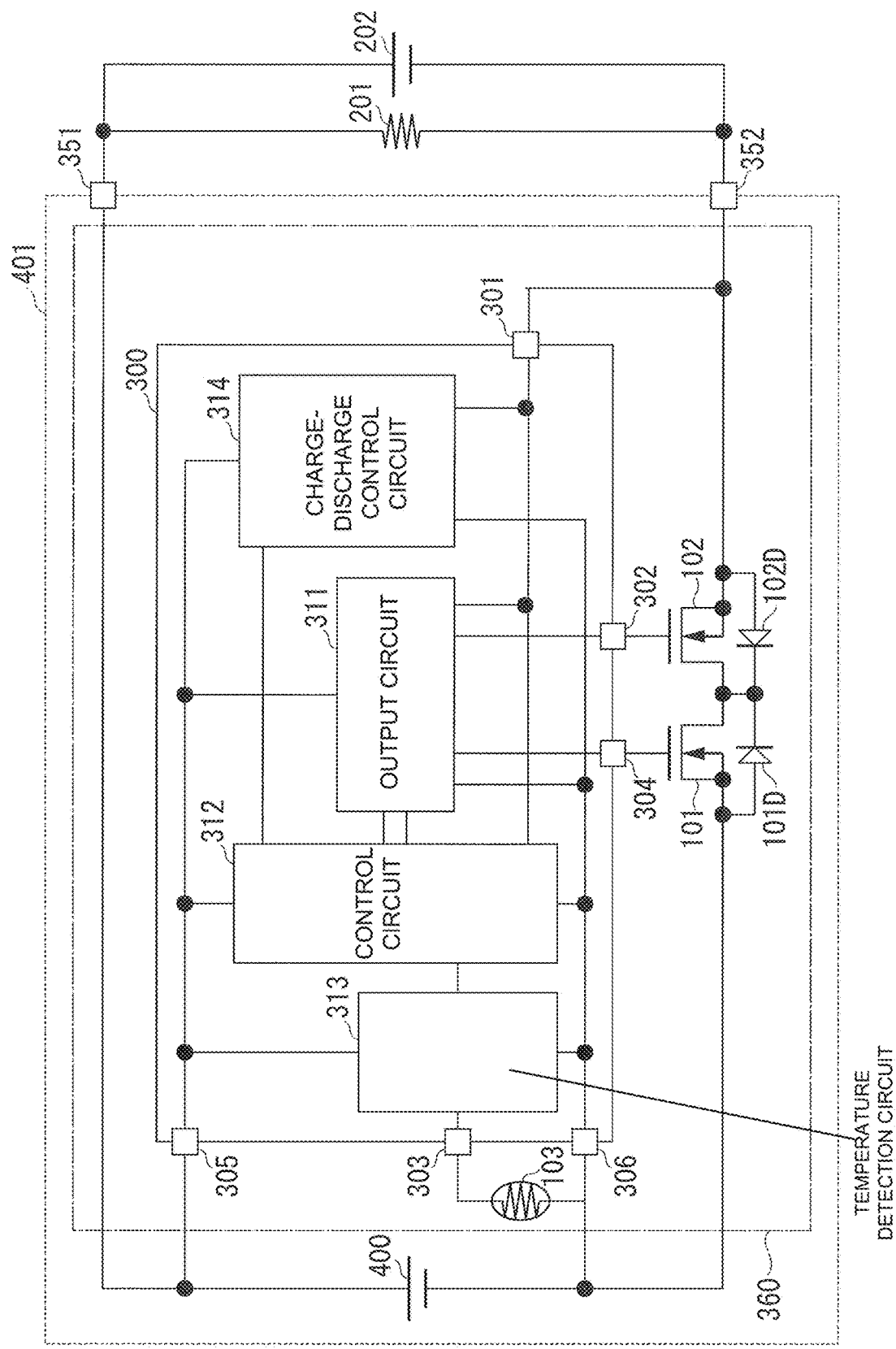
FIG. 1 is a circuit diagram illustrating a configuration example of a battery device including a charge-discharge control circuit according to an embodiment of the present invention.

FIG. 1 is a circuit diagram illustrating a configuration example of a battery device including a charge-discharge control circuit and a charge-discharge control device according to the embodiment.

In FIG. 1, a battery device 401 includes a battery 400 and a charge-discharge control device 360. The charge-discharge control device 360 includes a charge-discharge control circuit 300, a discharge control FET 101, a charge control FET 102, and a temperature detection element 103.

The charge-discharge control circuit 300 also includes an output circuit 311, a control circuit 312, a temperature detection circuit 313, and a charge-discharge discrimination circuit 314.

The battery device 401 has an external positive terminal 351 and an external negative terminal 352. The battery device 401 discharges the battery 400 to a load 201 by the connection of the load 201 between the external positive terminal 351 and the external negative terminal 352. On the other hand, the battery device 401 charges the battery 400 by the connection of a charger 202 between the external positive terminal 351 and the external negative terminal 352. A charge-discharge path of the battery 400 in the battery device 401 is a path in which the discharge control FET 101 and the charge control FET 102 to cause a charging current to flow into the battery 400 or a discharging current to flow from the battery 400 are inserted in series between the external positive terminal 351 and the external negative terminal 352.

The charge-discharge control circuit 300 includes an external negative-voltage input terminal 301, a charge control terminal 302, a discharge control terminal 304, a temperature detection terminal 303, a positive power-supply terminal 305, and a negative power-supply terminal 306.

The discharge control FET 101 is an N-channel FET having the source and back gate connected to the negative power-supply terminal 306, and the gate connected to the discharge control terminal 304. The discharge control FET 101 has a body diode 101D with the source as the anode and the drain as the cathode.

The charge control FET 102 is an N-channel FET having the source and back gate connected to the external negative terminal 352 and the external negative-voltage input terminal 301, the gate connected to the charge control terminal 302, and the drain connected to the drain of the discharge control FET 101. The charge control FET 102 has a body diode 102D with the source as the anode and the drain as the cathode.

The battery 400 has the positive terminal which is connected to the positive power-supply terminal 305 and the external positive terminal 351, and the negative terminal which is connected to the negative power-supply terminal 306 and the source and back gate of the discharge control FET 101.

The temperature detection element 103 is, for example, an NTC thermistor element whose resistance changes corresponding to the temperature of a location, such as the battery 400, the discharge control FET 101, the charge control FET 102, the substrate of the charge-discharge control circuit 300, or the housing of the battery device 401. The charge-discharge control circuit 300 measures the resistance through the temperature detection terminal 303 to discriminate whether the resistance is above or below the internally set charge-inhibition temperature and discharge-inhibition temperature.

The output circuit 311 performs on/off control of the discharge control FET 101 and the charge control FET 102 according to a charge-inhibition signal and a discharge-inhibition signal supplied from the control circuit 312.

The output circuit 311 outputs the voltage at the positive power-supply terminal 305 to the charge control terminal 302 and the discharge control terminal 304 in a state where neither the charge-inhibition signal nor the discharge-inhibition signal is supplied.

The output circuit 311 outputs the voltage at the external negative-voltage input terminal 301 to the charge control terminal 302 by the supply of the charge-inhibition signal to turn off the charge control FET 102. On the other hand, the output circuit 311 applies the voltage at the negative power-supply terminal 306 to the discharge control terminal 304 by the supply of the discharge-inhibition signal to turn off the discharge control FET 101.

The control circuit 312 measures a delay time and discriminates states to perform temperature-based charge-discharge control according to a signal supplied from the temperature detection circuit 313 and indicating whether the current temperature is above or below the internally set charge-inhibition temperature/discharge-inhibition temperature.

The control circuit 312 outputs neither the charge-inhibition signal nor the discharge-inhibition signal and permits both charging and discharging regardless of a charge-discharge discrimination signal supplied from the charge-discharge discrimination circuit 314 in a normal state which is neither the temperature-based discharge-inhibition state nor the temperature-based charge-inhibition state.

On the other hand, the control circuit 312 outputs the charge-inhibition signal to the output circuit 311 to inhibit charging in the temperature-based charge-inhibition state, but not in the temperature-based discharge-inhibition state, in a case where the charge-discharge discrimination signal supplied from the charge-discharge discrimination circuit 314 indicates charging.

The control circuit 312 outputs neither the charge-inhibition signal nor the discharge-inhibition signal in the temperature-based charge-inhibition state but not in the temperature-based discharge-inhibition state, in a case where the charge-discharge discrimination signal supplied from the charge-discharge discrimination circuit 314 indicates discharging.

Further, the control circuit 312 counts time to determine whether time t1 which is a preset period has passed or not.

Likewise, the control circuit 312 counts time to determine whether time t2 which is a preset period has passed or not.

The temperature detection circuit 313 measures a voltage generated by the resistance of the temperature detection element 103 through the temperature detection terminal 303 to compare the current temperature with set voltages for the discharge-inhibition high temperature THD, the charge-inhibition high temperature THC, the charge-inhibition low temperature TCC, and the discharge-inhibition low temperature TCD.

Figure 3:
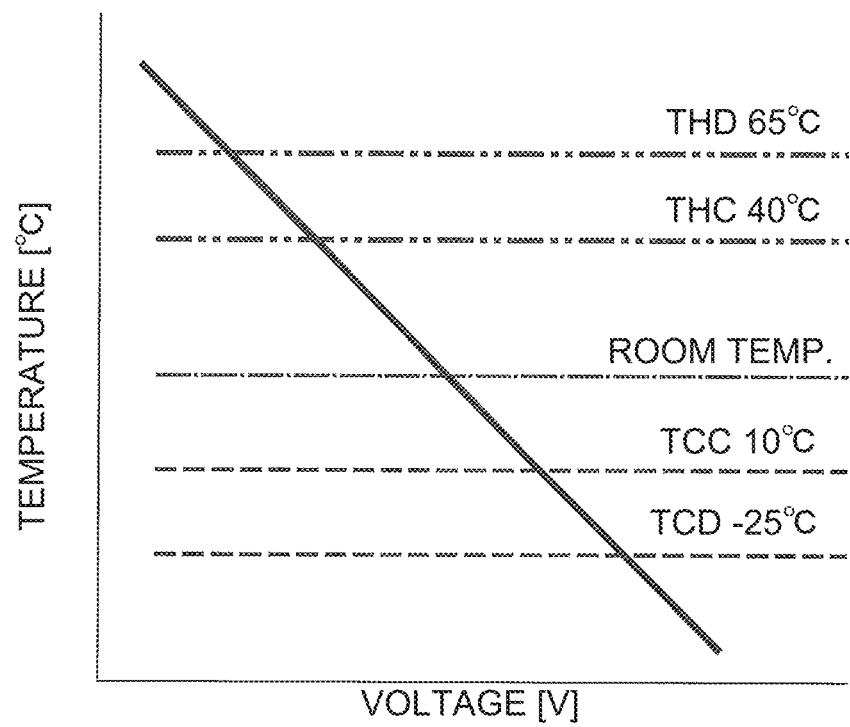
FIG. 3 is a chart illustrating a setting example of a charge-inhibition temperature to inhibit charging and a discharge-inhibition temperature to inhibit discharging.
Figure 4:
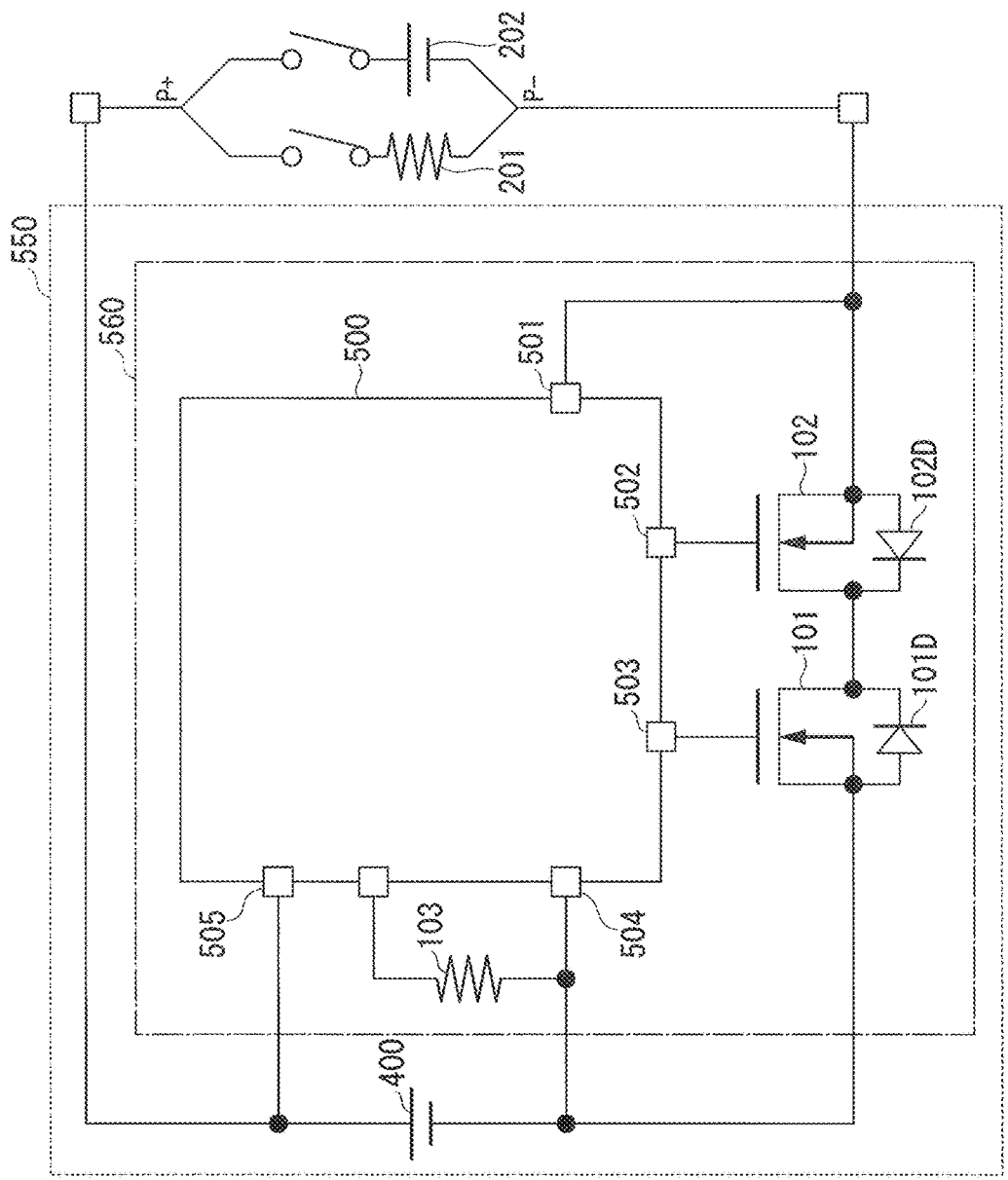
FIG. 4 is a circuit diagram for describing a charge-discharge control example of a battery in a battery device.
Figure 5:
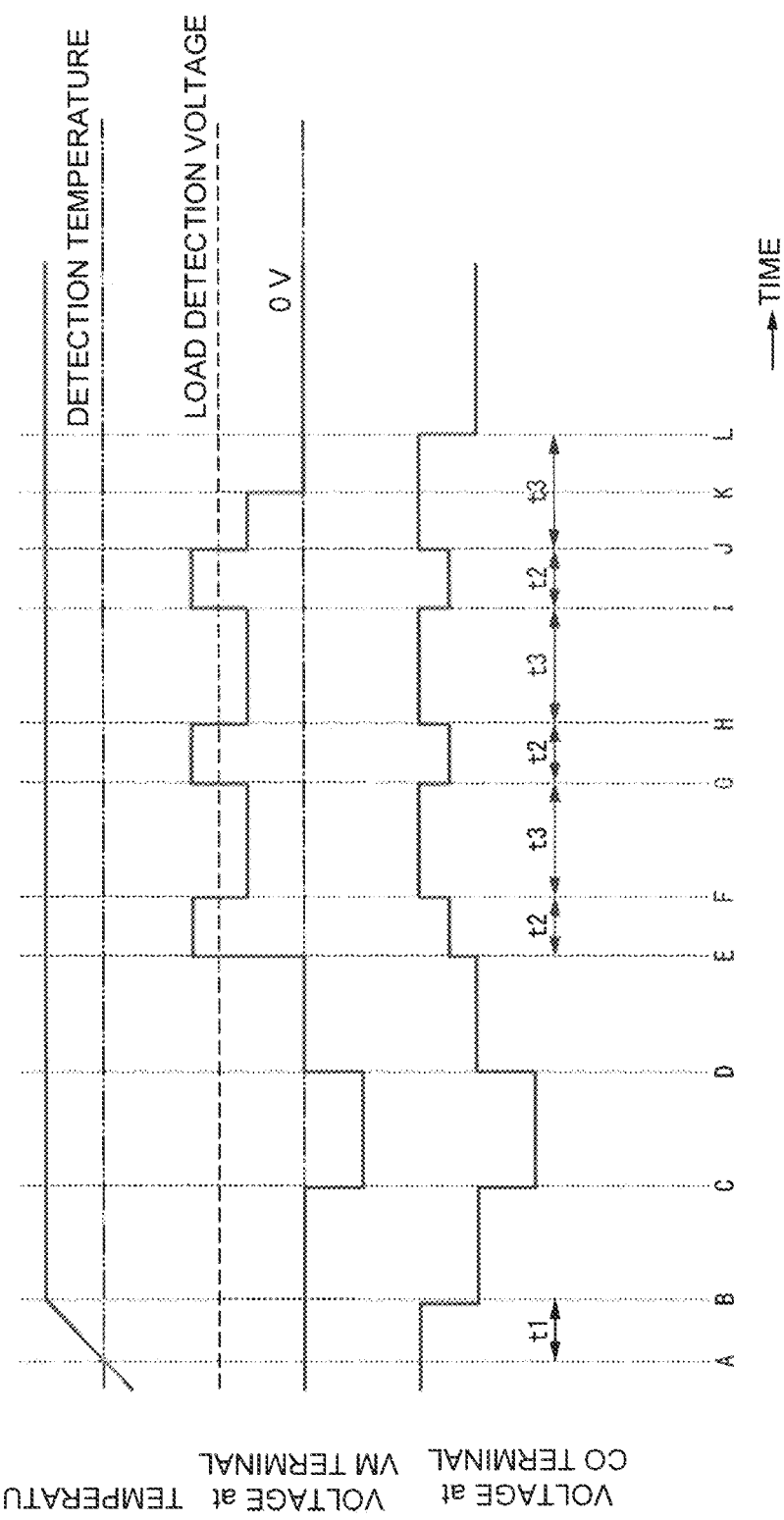
FIGS. 5A, 5B and 5C are timing charts for describing an operation example of charge-discharge control in a charge-inhibition state described above.

In the temperature detection circuit 313, the discharge-inhibition high temperature THD, the charge-inhibition high temperature THC, the discharge-inhibition low temperature TCD, and the charge-inhibition low temperature TCC described above are preset according to a correspondence relationship as illustrated in FIG. 3. FIG. 3 illustrates a setting example of the charge-inhibition temperature to inhibit charging and the discharge-inhibition temperature to inhibit discharging. The ordinate is the temperature detected by the temperature detection element 103, and the abscissa is the voltage at the temperature detection terminal 303 of the charge-discharge control circuit 300.

According to FIG. 3 described above, in a case where the current temperature is below the charge-inhibition high temperature THC and is above the charge-inhibition low temperature TCC, the temperature detection circuit 313 outputs, to the control circuit 312, a signal indicating the current temperature.

Since the current temperature is below the charge-inhibition high temperature THC and the current temperature is above the charge-inhibition low temperature TCC, the control circuit 312 discriminates that the state is normal. Neither the charge-inhibition signal nor the discharge-inhibition signal is supplied to the output circuit 311.

On the other hand, in a case where the current temperature is higher than or equal to the charge-inhibition high temperature THC or the current temperature is lower than or equal to the charge-inhibition low temperature TCC, the temperature detection circuit 313 outputs, to the control circuit 312, a signal indicating the current temperature.

Since the current temperature is either higher than or equal to the charge-inhibition high temperature THC or lower than or equal to the charge-inhibition low temperature TCC, the control circuit 312 discriminates that the state is the charge-inhibition state, and outputs the charge-inhibition signal to the output circuit 311.

Further, in a case where the current temperature is higher than or equal to the discharge-inhibition high temperature THD or the current temperature is lower than or equal to the discharge-inhibition low temperature TCD, the temperature detection circuit 313 outputs, to the control circuit 312, a signal indicating the current temperature.

Since the current temperature is either higher than or equal to the discharge-inhibition high temperature THD or lower than or equal to the discharge-inhibition low temperature TCD, the control circuit 312 discriminates that the state is the discharge-inhibition state, and outputs the discharge-inhibition signal to the output circuit 311.

The charge-discharge discrimination circuit 314 compares the voltage at the external negative-voltage input terminal 301 with a preset charge-discharge discrimination voltage VJD.

In the on state of both the discharge control FET 101 and the charge control FET 102 the charge-discharge discrimination circuit 314 then discriminates that a discharging current is flowing in a case where the voltage at the external negative-voltage input terminal 301 is higher than or equal to the preset charge-discharge discrimination voltage VJD. In this case, the charge-discharge discrimination circuit 314 outputs a signal indicative of discharging to the control circuit 312.

On the other hand, in the on state of both the discharge control FET 101 and the charge control FET 102 the charge-discharge discrimination circuit 314 discriminates that a charging current is flowing in a case where the voltage at the external negative-voltage input terminal 301 is below the preset charge-discharge discrimination voltage VJD. In this case, the charge-discharge discrimination circuit 314 outputs a signal indicative of charging to the control circuit 312.

It is ideal to set the charge-discharge discrimination voltage VJD as the voltage at the negative power-supply terminal 306. Since the charging current flows from the negative terminal of the battery 400 in the direction of the external negative terminal 352, the flow of the charging current causes a fall of the voltage at the external negative-voltage input terminal 301 below the voltage at the negative power-supply terminal 306. On the other hand, since the discharging current flows from the external negative terminal 352 in the direction of the negative terminal of the battery 400, the flow of the discharging current causes a rise of the voltage at the external negative-voltage input terminal 301 above the voltage at the negative power-supply terminal 306. As described above, the setting of the charge-discharge discrimination voltage VJD as the voltage at the negative power-supply terminal 306 makes it possible to discriminate accurately whether the charging current is flowing or whether the discharging current is flowing.

However, since it is difficult to set the charge-discharge discrimination voltage VJD as the voltage at the negative power-supply terminal 306 due to manufacturing variation, a voltage obtained by increasing the voltage at the negative power-supply terminal 306 by a predetermined voltage a as a marginal voltage is set as the charge-discharge discrimination voltage VJD to reliably discriminate that the charging current is flowing.

On the other hand, a voltage obtained by decreasing the voltage at the negative power-supply terminal 306 by the predetermined voltage a as the marginal voltage is set as the charge-discharge discrimination voltage VJD to reliably discriminate that the discharging current is flowing.

In the embodiment, the charge-discharge discrimination voltage VJD is used as the voltage obtained by increasing the voltage at the negative power-supply terminal 306 by the predetermined voltage a as the marginal voltage to reliably discriminate that the charging current is flowing.

Figure 2:
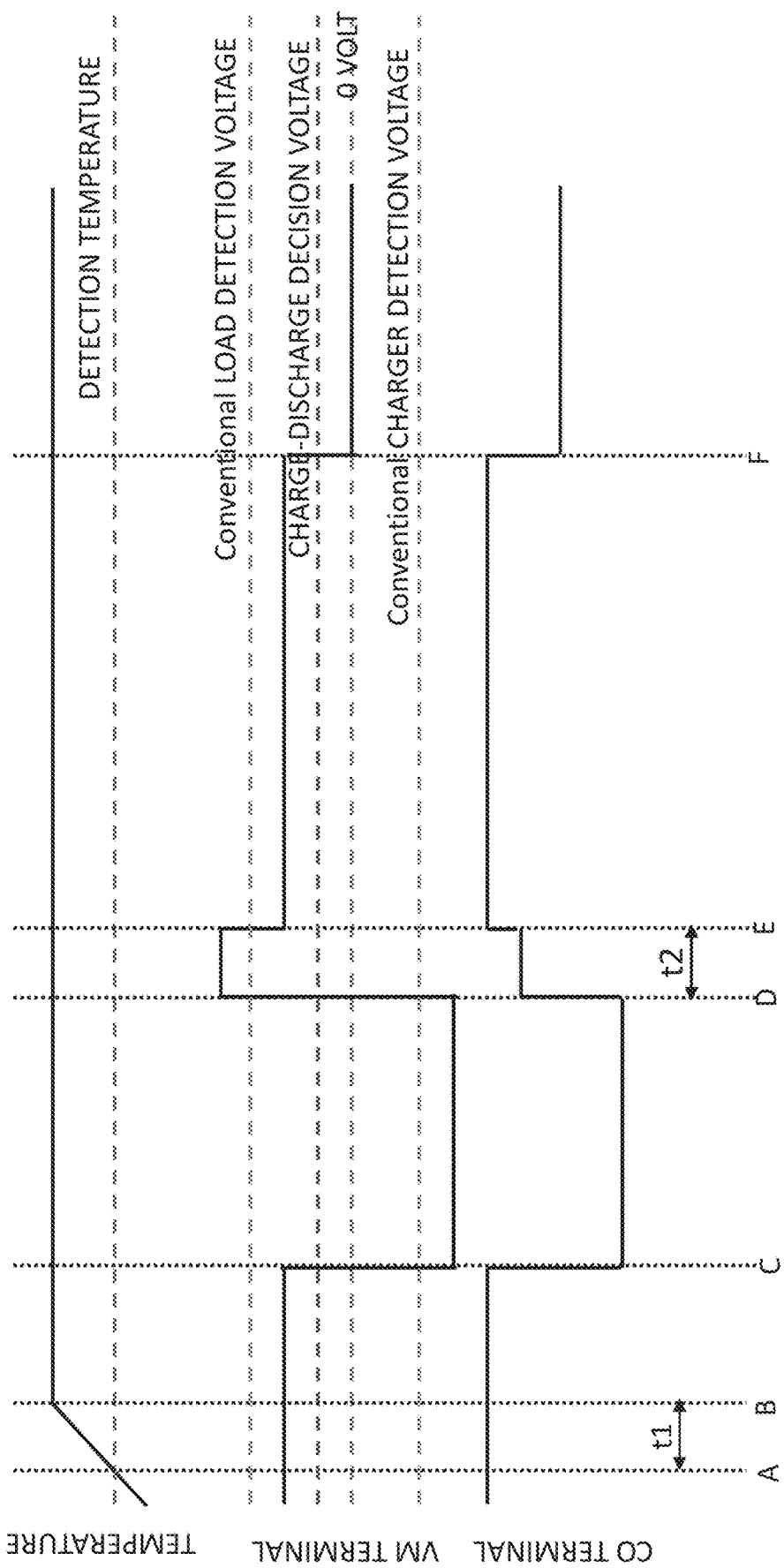
FIG. 2 is a waveform chart for describing an operation example of the battery device including the charge-discharge control circuit according to the embodiments.

Referring next to FIG. 2, the operation of the charge-discharge control circuit according to the embodiment will be described. FIG. 2 is a waveform chart for describing an operation example of the battery device including the charge-discharge control circuit according to the embodiment.

Time A: The temperature detection circuit 313 outputs, to the control circuit 312, a signal indicating that the current temperature is above the charge-inhibition high temperature THC.

The control circuit 312 thereby starts counting time t1.

At this point, the control circuit 312 causes the output circuit 311 to provide the voltage at the positive power-supply terminal 305 to the charge control terminal 302 and the discharge control terminal 304 to supply current to the load 201. The discharge control FET 101 and the charge control FET 102 are thus turned on, and the discharging current flows.

Time B: Since the preset time t1 has passed since the start of counting time, the control circuit 312 changes control from the normal state to the charge-inhibition state.

Since the voltage at the external negative-voltage input terminal 301 is higher than or equal to the charge-discharge discrimination voltage VJD at this time, the charge-discharge discrimination circuit 314 outputs, to the control circuit 312, a signal indicative of discharging.

The control circuit 312 thereby permits both charging and discharging without outputting the charge-inhibition signal and the discharge-inhibition signal to the output circuit 311.

As a result, the output circuit 311 outputs the voltage at the positive power-supply terminal 305 to the discharge control terminal 304 and the charge control terminal 302 to turn on the discharge control FET 101 and the charge control FET 102 so as to keep the discharging current flowing.

Time C: At this point, the charger 202 is connected.

Since the charging current flows through the discharge control FET 101 and the charge control FET 102 in the on state, the voltage at the external negative-voltage input terminal 301 drops by a voltage generated by the channel resistance of the discharge control FET 101 and the charge control FET 102 and falls below the charge-discharge discrimination voltage VJD.

The charge-discharge discrimination circuit 314, at this time, detects that the voltage at the external negative-voltage input terminal 301 is below the charge-discharge discrimination voltage VJD, and outputs the signal indicative of charging to the control circuit 312.

Since the control circuit 312 is in the charge-inhibition state, the charge-inhibition signal is supplied to the output circuit 311 by the supply of the signal indicative of charging from the charge-discharge discrimination circuit 314.

The output circuit 311 thereby applies the voltage at the external negative-voltage input terminal 301 to the charge control terminal 302 so as to turn off the charge control FET 102.

Time D: At this point, the charger 202 is disconnected from the battery device 401.

This makes the discharging current flow through the discharge control FET 101 in the on state and the body diode 102D of the charge control FET 102 in the off state to cause the voltage at the external negative-voltage input terminal 301 to rise to a voltage higher than or equal to the charge-discharge discrimination voltage VJD by the voltage generated across the discharge control FET 101 and the body diode 102D of the charge control FET 102.

The charge-discharge discrimination circuit 314, at this time, detects that the voltage at the external negative-voltage input terminal 301 is higher than or equal to the charge-discharge discrimination voltage VJD, and outputs, to the control circuit 312, a signal indicative of the discharging state. Here, the control circuit 312 maintains the output of the charge-inhibition signal to the output circuit 311.

The control circuit 312 then starts counting time t2.

Time E: After time t2 as the counting period, the control circuit 312 stops the output of the charge-inhibition signal to the output circuit 311.

The output circuit 311 then outputs, to the charge control terminal 302, the voltage at the positive power-supply terminal 305 to turn on the charge control FET 102.

By the flow of the discharging current through the channel of the charge control FET 102, the voltage at the external negative-voltage input terminal 301 drops, but the voltage is maintained to be higher than or equal to the charge-discharge discrimination voltage VJD by the voltage generated across the discharge control FET 101 and the charge control FET 102. The charge-discharge discrimination circuit 314 thereby outputs, to the control circuit 312, the signal indicative of discharging.

Time F: At this point, the load 201 is released from the battery device 401, and neither the load 201 nor the charger 202 is connected.

Thereby discharging current stops, and the voltage at the external negative-voltage input terminal 301 drops to fall below the charge-discharge discrimination voltage VJD by the voltage generated across the discharge control FET 101 and the charge control FET 102.

The charge-discharge discrimination circuit 314 then outputs, to the control circuit 312, the signal indicative of charging.

Since the current state is the charge-inhibition state, the control circuit 312 outputs the charge-inhibition signal to the output circuit 311 by the supply of the signal indicative of charging from the charge-discharge discrimination circuit 314.

The output circuit 311 thus outputs, to the charge control terminal 302, the voltage at the external negative-voltage input terminal 301 to turn off the charge control FET 102.

As described above, since the charge-discharge control device 360 in the embodiment discriminates whether the discharging current is flowing or not depending on whether the voltage at the external negative-voltage input terminal 301 is higher than or equal to the charge-discharge discrimination voltage VJD during the charge-inhibition state defined by the inequality: charge-inhibition high temperature THC> detected temperature≥discharge-inhibition high temperature THD, discharge control in the charge-inhibition state can be performed without on/off control of the charge control FET 102.

The operation of the charge-discharge control circuit 300 described above is carried out in the same way even in the charge-inhibition state defined by the inequality: charge-inhibition low temperature TCC< detected temperature≤ discharge-inhibition low temperature TCD.

In the embodiment, since the charge control FET 102 is not turned off during flowing of the discharging current, the battery device 401 can suppress the generation of ripple-like noise and can supply a stable voltage to the connected devices.

Second Embodiment

A second embodiment will be described with reference to the accompanying drawings. Since the configuration of the second embodiment is the same as the configuration example of the battery device including the charge-discharge control circuit according to the first embodiment illustrated in FIG. 1, a redundant description of components common to those in the first embodiment will be omitted.

The second embodiment differs from the first embodiment in that the relation among the discharge-inhibition high temperature THD, the charge-inhibition high temperature THC, the discharge-inhibition low temperature TCD, and the charge-inhibition low temperature TCC is different from that in the first embodiment.

Figure 6:
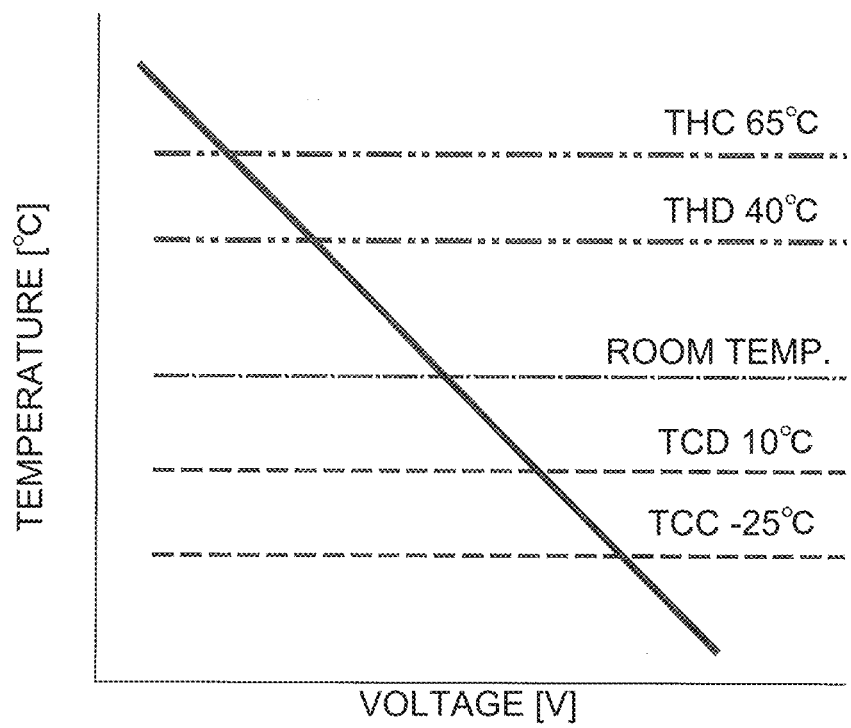
FIG. 6 is a chart illustrating another setting example of a charge-inhibition temperature to inhibit charging and a discharge-inhibition temperature to inhibit discharging.

In the second embodiment, as shown in FIG. 6 which is a chart illustrating another setting example of a charge-inhibition temperature to inhibit charging and a discharge-inhibition temperature to inhibit discharging, the relation is indicated by the inequality: charge-inhibition high temperature THC> discharge-inhibition high temperature THD> discharge-inhibition low temperature TCD> charge-inhibition low temperature TCC.

In the second embodiment, the charge-discharge control circuit is in the normal state in which both the charging and the discharging are not inhibited when the temperature is below the discharge-inhibition high temperature THD and is above the discharge-inhibition low temperature TCD.

Then, in the second embodiment, the charge-discharge control circuit is in the discharge-inhibition state when the temperature is higher than or equal to the discharge-inhibition high temperature THD and is below the charge-inhibition high temperature THC, or when the temperature is lower than or equal to the discharge-inhibition low temperature TCD and is above the charge-inhibition low temperature TCC.

Further, in the second embodiment, the charge-discharge control circuit is in the discharge-inhibition state and the charge-inhibition state when the temperature is higher than or equal to the charge-inhibition high temperature THC or when the temperature is lower than or equal to the charge-inhibition low temperature TCC.

The second embodiment thus aims at charge control in a state that the temperature is higher than or equal to the discharge-inhibition high temperature THD and is below the charge-inhibition high temperature THC, or that the temperature is lower than or equal to the discharge-inhibition low temperature TCD and is above the charge-inhibition low temperature TCC. In other words, the second embodiment aims at charge control for the battery 400 in the discharge-inhibition state in which charging is permitted.

Like in the first embodiment, the charge-discharge discrimination voltage VJD is set as the voltage at the negative power-supply terminal 306 even in the second embodiment.

However, like in the first embodiment, since it is difficult to set the charge-discharge discrimination voltage VJD as the voltage at the negative power-supply terminal 306 due to manufacturing variation, in the second embodiment the charge-discharge discrimination voltage VJD is used as a voltage obtained by decreasing the voltage at the negative power-supply terminal 306 by the predetermined voltage a as the marginal voltage to reliably discriminate that the discharging current is flowing.

In the normal state which is neither the temperature-based discharge-inhibition state nor the temperature-based charge-inhibition state, the control circuit 312 outputs neither the charge-inhibition signal nor the discharge-inhibition signal to permit both charging and discharging regardless of the charge-discharge discrimination signal supplied from the charge-discharge discrimination circuit 314.

Further, the control circuit 312 outputs the discharge-inhibition signal to the output circuit 311 to inhibit discharging in the temperature-based discharge-inhibition state, but not in the temperature-based charge-inhibition state, and in a case where the charge-discharge discrimination signal supplied from the charge-discharge discrimination circuit 314 indicates discharging.

Further, the control circuit 312 outputs neither the discharge-inhibition signal nor the charge-inhibition signal to the output circuit 311 in the temperature-based discharge-inhibition state, but not in the temperature-based charge-inhibition state, in a case where the charge-discharge discrimination signal supplied from the charge-discharge discrimination circuit 314 indicates charging.

According to the configuration described above, in the second embodiment, the control on the discharge control FET 101 in the first embodiment is performed on the charge control FET 102, and conversely the control on the charge control FET 102 in the first embodiment is performed on the discharge control FET 101.

In the second embodiment, since it is discriminated whether the charging current is flowing through the charge-discharge control device 360 or not depending on whether the voltage at the external negative-voltage input terminal 301 is lower than or equal to the charge-discharge discrimination voltage VJD or not during the discharge-inhibition state defined by the inequality: discharge-inhibition high temperature THD≤ detected temperature< charge-inhibition high temperature THC, charge control in the discharge-inhibition state can be performed without performing on/off control of the discharge control FET 101.

The operation of the charge-discharge control circuit described above is carried out in the same way even in the discharge-inhibition state defined by the inequality: charge-inhibition low temperature TCC< detected temperature≤ discharge-inhibition low temperature TCD.

While the embodiments of this invention have been described in detail, the specific configuration is not limited to that in the embodiments, and design changes without departing from the scope of this invention shall be included.

The charge-discharge control circuit makes a transition to the charge-inhibition state or the discharge-inhibition state as a result of the temperature detection, but the detection is not limited to the temperature detection. For example, the charge-discharge control circuit may make a transition to the charge-inhibition state or the discharge-inhibition state by detecting a predetermined external signal supplied from an unillustrated external device.

Further, the charge-discharge control device includes the charge control FET 102 and the discharge control FET 101 on the negative terminal side of the battery 400, but the charge control FET 102 and the discharge control FET 101 may be provided on the positive terminal side of the battery 400. In this case, the external negative-voltage input terminal 301 is connected as an external positive-voltage input terminal to the side of the external positive terminal 351, and the charge-discharge discrimination voltage VJD is set as the voltage at the positive power-supply terminal 305.

Further, the charge-discharge discrimination circuit 314 discriminates the charging state or the discharging state depending on the voltage at the external negative-voltage input terminal 301, but the charge-discharge discrimination circuit 314 may discriminate the charging state or the discharging state depending on the voltage at an overcurrent detection terminal. In other words, the charge-discharge discrimination circuit has only to receive a voltage in a charge-discharge path varying depending on whether the state is the charging state or the discharging state in order to compare the voltage with the charge-discharge discrimination voltage.

What is claimed is:

1. A charge-discharge control circuit, comprising:
    a positive power-supply terminal;
    a negative power-supply terminal;
    a charge-discharge discrimination circuit configured to discriminate a discharging state in which a discharging current flows and a charging state in which a charging current flows based on a voltage at a charge-discharge path and a preset charge-discharge discrimination voltage; and
    a control circuit configured to:
        turn on a discharge control FET and a charge control FET when in a charge-inhibition state and in the discharging state; and
        turn off the charge control FET when in the charge-inhibition state and in the charging state.

2. The charge-discharge control circuit according to claim 1, wherein the charge-discharge discrimination voltage is set to a voltage at the negative power-supply terminal.

3. The charge-discharge control circuit according to claim 1, wherein the charge-discharge discrimination voltage is set to a voltage at the positive power-supply terminal.

4. A charge-discharge control device, comprising:
a discharge control FET configured to control discharging;
a charge control FET configured to control charging; and
the charge-discharge control circuit according to claim 1.

5. A battery device, comprising:
a battery; and
the charge-discharge control device configured to control charging and discharging of the battery according to claim 4.

6. A charge-discharge control circuit, comprising:
a positive power-supply terminal;
a negative power-supply terminal;
a charge-discharge discrimination circuit configured to discriminate a charging state in which a charging current flows and a discharging state in which a discharging current flows based on a voltage in a charge-discharge path and a preset charge-discharge discrimination voltage; and
a control circuit configured to:
turn on a discharge control FET and a charge control FET when in a discharge-inhibition state and in the charging state; and
turn off the discharge control FET when in the discharge-inhibition and in the discharging state.

7. The charge-discharge control circuit according to claim 6, wherein the charge-discharge discrimination voltage is set to a voltage at the negative power-supply terminal.

8. The charge-discharge control circuit according to claim 6, wherein the charge-discharge discrimination voltage is set to a voltage at the positive power-supply terminal.

9. A charge-discharge control device, comprising:
a discharge control FET configured to control discharging;
a charge control FET configured to control charging; and
the charge-discharge control circuit according to claim 6.

10. A battery device, comprising:
a battery; and
the charge-discharge control device configured to control charging and discharging of the battery according to claim 9.

* * * * *